United States Patent
Ichinose et al.

(10) Patent No.: US 6,304,468 B2
(45) Date of Patent: Oct. 16, 2001

(54) PHASE SYNCHRONIZATION SYSTEM FOR CONNECTING A POWER CONVERTER TO A POWER DISTRIBUTION SYSTEM

(75) Inventors: Masaya Ichinose; Motoo Futami, both of Hitachiota; Shigeta Ueda, Hitachi; Kazuo Suzuki, Hitachi; Akira Maekawa, Hitachi; Yasuhiro Kiyofuji, Hitachi, all of (JP)

(73) Assignees: Hitachi, Ltd., Tokyo; Hitachi Engineering & Services Co., Ltd., Hiatchi, both of (JP)

( * ) Notice: Subject to any disclaimer, the term of this patent is extended or adjusted under 35 U.S.C. 154(b) by 0 days.

(21) Appl. No.: 09/748,268

(22) Filed: Dec. 27, 2000

(30) Foreign Application Priority Data

Dec. 28, 1999 (JP) .................................. 11-372678

(51) Int. Cl.$^7$ .................................................. H02H 7/122
(52) U.S. Cl. .................................. 363/55; 363/95; 307/87
(58) Field of Search ........................... 363/34, 35, 37, 363/51, 55, 56.02, 58, 95, 96, 98; 307/87, 127

(56) References Cited

U.S. PATENT DOCUMENTS

| | | | |
|---|---|---|---|
| 4,218,625 | * | 8/1980 | Beckwith et al. ............... 307/87 |
| 4,314,189 | * | 2/1982 | Okado et al. ............... 363/37 |
| 4,667,283 | * | 5/1987 | Seki et al. ............... 363/95 |
| 4,797,570 | * | 1/1989 | Fox ............... 307/87 |
| 4,797,799 | * | 1/1989 | Inokuchi et al. ............... 363/37 |
| 5,111,377 | * | 5/1992 | Higasa et al. ............... 363/95 |
| 5,255,176 | * | 10/1993 | Haffa et al. ............... 363/98 |
| 5,446,645 | * | 8/1995 | Shirahama et al. ............... 363/55 |
| 5,625,539 | * | 4/1997 | Nakata et al. ............... 363/98 |
| 6,128,204 | * | 10/2000 | Monro et al. ............... 363/37 |
| 6,140,803 | * | 10/2000 | Hurley et al. ............... 307/87 |

FOREIGN PATENT DOCUMENTS

| | | | |
|---|---|---|---|
| 8009648 | * | 1/1996 | (JP) ............... H02M/7/48 |
| 8066048 | * | 3/1996 | (JP) ............... H02M/7/48 |

* cited by examiner

*Primary Examiner*—Jeffrey Sterrett
(74) *Attorney, Agent, or Firm*—Antonelli, Terry, Stout & Kraus, LLP

(57) ABSTRACT

A power converter system includes: a circuit breaker having one terminal connected to a power system and another terminal connected to a load; a transformer for interconnection; a power converter; and a controller for controlling the power converter, wherein, during a return to grid connected operation, the power converter is controlled such that the phase of an output voltage of the power converter matches the phase of the system voltage, and the circuit breaker is closed, so as to prevent an overcurrent during a changeover from the self commutated operation to the grid connected operation of the power converter.

8 Claims, 20 Drawing Sheets

PHASE SYNCHRONIZATION SYSTEM FOR CONNECTING A POWER CONVERTER TO A POWER DISTRIBUTION SYSTEM

BACKGROUND OF THE INVENTION

A power converter which absorbs or releases electric power in interconnected relation to a power system is described in JP-A-8-66048. In a controller for the converter described in JP-A-8-66048, self commutated operation is performed with respect to a load by switching the control of the converter at the time of the self commutated operation of the converter from current control using a first phase-locked loop (PLL) to voltage control using a second PLL. In a converter described in Japanese Patent Application Laid-open Hei 8-9648 (JP-A-8-9648), an arrangement is provided such that when returning from self commutated operation to grid connected operation, voltage phases and amplitudes of a system voltage and a converter output are determined, and the moment when they coincide with each other, a coincidence signal is imparted to close a circuit breaker, whereupon the converter is temporarily stopped and the operation is resumed, thereby switching over control to grid connected operation.

With the conventional technique described in the aforementioned Japanese Patent Application Laid-open Hei 8-66048 (JP-A-8-66048), at the time of the switching between the self commutated operation and the grid connected operation, cases occur in which controlled variables do not utterly converge, and the controlled variables fluctuate in steps. In addition, there are cases where a converter system stops due to an overcurrent at the time of returning from the self commutated operation to the grid connected operation. For this reason, the converter must be stopped to restore the control when a changeover to the grid connected operation is effected. In addition, with the conventional technique described in the aforementioned JP-A-8-66048, there are cases where an overcurrent occurs at the time of operation of the circuit breaker.

SUMMARY OF THE INVENTION

It has been found out from a study conducted by the present inventors that causes of the overcurrent and the sudden fluctuations of the controlled variables in the above-described conventional art lie in a phase shift occurring in the operation of a switching on/off means such as the circuit breaker upon ascertaining the moment of phase matching, the changeover between a phase detector for grid connected operation and a phase detector for self commutated operation, and the changeover between current control and voltage control.

Accordingly, in the power converter system in accordance with the present invention, the converter is controlled such that the phase of an output voltage of the converter matches the phase of the system voltage, and the circuit breaker is closed so as to avoid the occurrence of an overcurrent. In addition, a common control system is adopted for grid connected operation and self commutated operation so as to avoid sudden fluctuations of the controlled variables.

The power converter system in accordance with the present invention has a controller for adjusting an output phase of the converter so as to eliminate a phase difference between an ac voltage on a power system side of the switching on/off means and an ac voltage on a load side thereof. In the converter in accordance with the present invention has a controller for outputting a signal for opening or closing the switching on/off means in response to the phase difference between the aforementioned ac voltages. Preferably, the controller has a current control system for switching over a current command between grid connected operation and self commutated operation.

Further the power converter system in accordance with the invention has the following features:
(1) A common current control system is used for grid connected operation and self commutated operation.
(2) A feedforward component of the output voltage of the converter is set to a fixed value during self commutated operation.
(3) One (d-axis or q-axis) command value for current control is used as an output of voltage control, the other input deviation for current control is set to zero, and a phase detection signal is used in coordinate transformation in current detection.
(4) The two-phase/three-phase coordinate transformation is self-oscillated.
(5) Integral quantities of a power regulator and an automatic voltage regulator are made to conform to the integral quantity of the regulator being used for control.
(6) The amount of correction of a phase difference Δθ during phase adjustment is provided with a limit, and the phase is adjusted with an amount of phase correction within an amount corresponding to the portion of frequency variation allowed for the system.
(7) The system-side voltage of the circuit breaker is used as a voltage command value of the voltage regulator, a limiter within the allowable range of the voltage variation which is determined by the system is provided for that value, and an output of the limiter is used as the command value.
(8) The feedforward detection value of the voltage of a converter controller is not fixed during self commutated operation.

DESCRIPTION OF THE EMBODIMENTS (First Embodiment)

Figure 1:
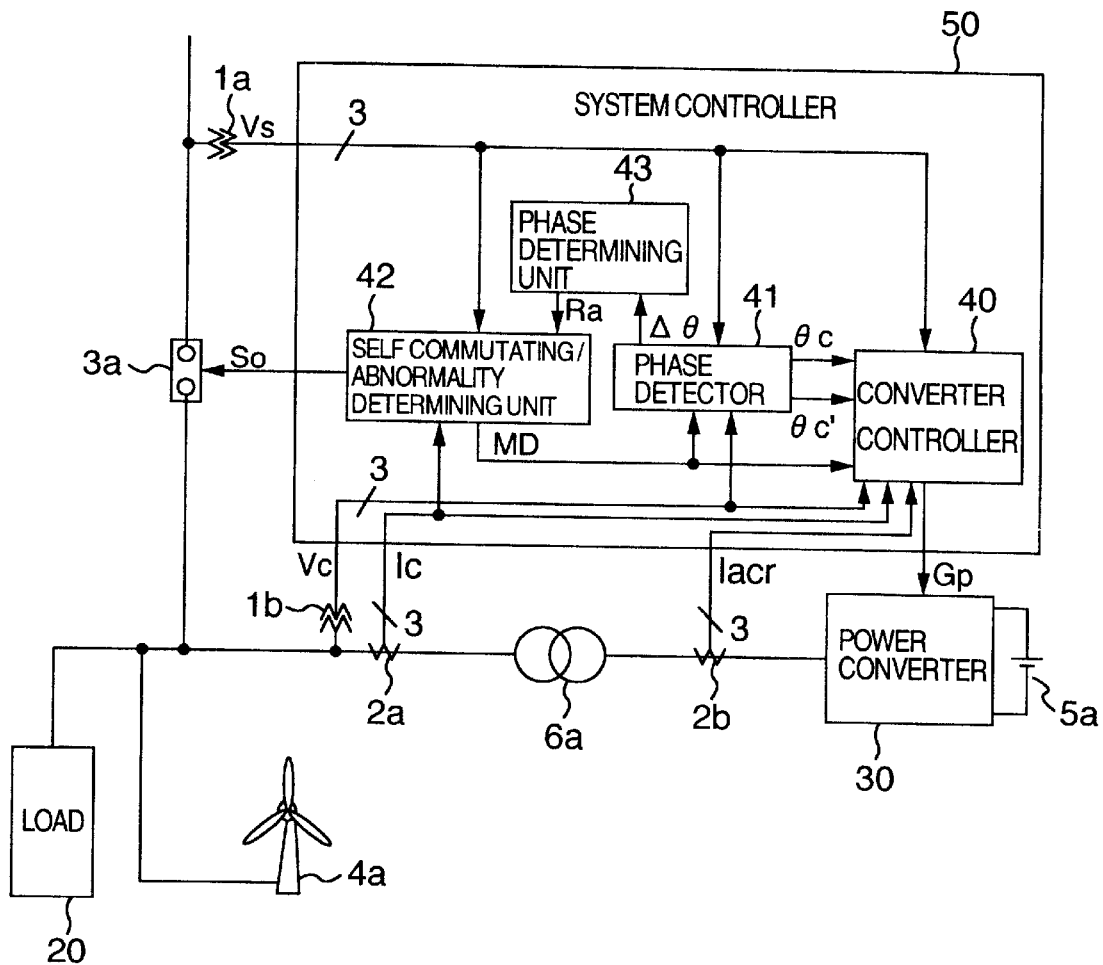
FIG. 1 is an explanatory diagram of a converter system in accordance with a first embodiment.

Referring to FIG. 1, a description will be given of a first embodiment of the invention. In FIG. 1, one terminal of a circuit breaker 3a is connected to a power system, while the other terminal thereof is connected to loads at houses of consumers, factories, a wind power generator system 4a, and the like, as well as a power converter system. The power converter system is comprised of a transformer 6a for interconnection, a power converter 30, a secondary battery 5a, and a system controller 50 for controlling the power converter 30. The power converter 30 supplies electric power to the loads 20, and stores electric energy generated by the wind power generator system 4a in the secondary battery 5a.

A voltage Vc at a tie point of the power converter 30 is detected by a voltage detector 1b, and is inputted to a phase detector 41. Meanwhile, a current Ic at the tie point of the power converter 30 is detected by a current detector 2a, and is inputted to a converter controller 40 and a self commutating/abnormality determining unit 42. An output current Iacr of the power converter 30 is detected by a current detector 2b, and is inputted to the converter controller 40. Further, a voltage Vs on the system side of the circuit breaker 3a is detected by a voltage detector 1a, and is inputted to the phase detector 41, the converter controller 40, and the self commutating/abnormality determining unit 42.

The converter controller 40 outputs a gate pulse Gp for controlling the converter on the basis of voltage phases θc and θc' outputted from the phase detector 41, the tie-point voltage Vc, the tie-point current Ic, and the converter current Iacr of the converter. The voltage Vs of the system, the voltage Vc at the tie point of the power converter 30, and a self commutating allowance signal MD which is an output of the self commutating/abnormality determining unit 42 are inputted to the phase detector 41, and the phase detector 41 outputs a phase difference Δθ between the system voltage Vs and the tie-point voltage Vc to the phase determining unit 43. The phase determining unit 43 determines the phase difference Δθ, and outputs a system interconnection allowance signal Ra to the self commutating/abnormality determining unit 42.

The self commutating/abnormality determining unit 42 detects the state of self commutated operation of the power converter system as well as events affecting the load such as an accident of the system on the basis of the system voltage Vs, the tie-point current Ic, and the interconnection allowance signal Ra inputted thereto. The self commutating/abnormality determining unit 42 outputs a signal So for opening or closing the circuit breaker to the circuit breaker 3a and outputs the self commutating allowance signal MD to the phase detector 41 and the converter controller 40. The circuit breaker 3a operates upon receiving the closing or opening signal So outputted from the self commutating/abnormality determining unit 42.

Figure 2:
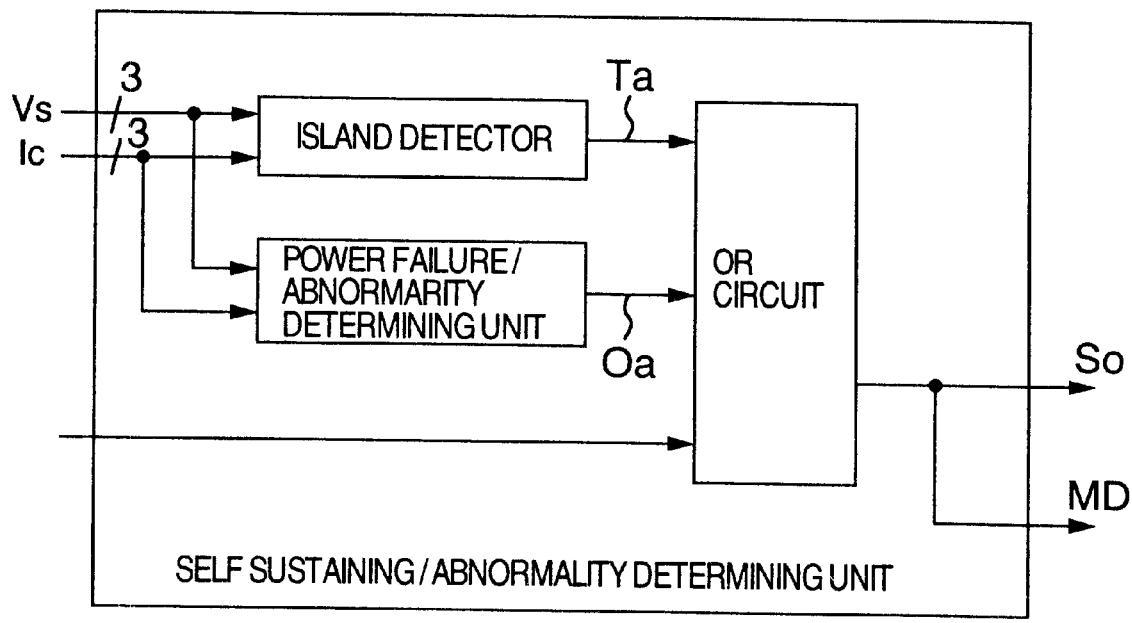
FIG. 2 is an explanatory diagram of a self commutating/abnormality determining unit in accordance with the first embodiment.

FIG. 2 shows the details of the self commutating/abnormality determining unit 42. In FIG. 2, the system voltage Vs and the tie-point current Ic are respectively inputted to a self commutated operation detector and a power failure/overvoltage detector. The island detector detects the state of island operation from the tie-point current Ic and the system voltage Vs, and upon detecting the state of self commutated operation the island detector sets the value of a signal Ta to a "1," and outputs it to an OR circuit. Meanwhile, the power failure/overvoltage detector detects the degree of a drop or rise in voltage, and when an abnormality is detected, the power failure/overvoltage detector sets the value of a signal Oa to a "1," and outputs it to the OR circuit. The interconnection allowance signal Ra ("0" when interconnection is allowed, and "1" when it is not allowed), which is the output of the phase determining unit, is also inputted to the OR circuit. Thus, when any one of the self commutated operation signal Ta, the power failure/overvoltage signal Oa, and the interconnection allowance signal Ra is a "1," the OR circuit outputs the opening signal So to the circuit breaker 3a to open the circuit breaker 3a or continue the open state of the circuit breaker 3a. In addition, at the same time as outputting the circuit-breaker opening signal So, the OR circuit outputs the self commutating allowance signal MD to the phase detector 41 and the converter controller 40.

Figure 3:
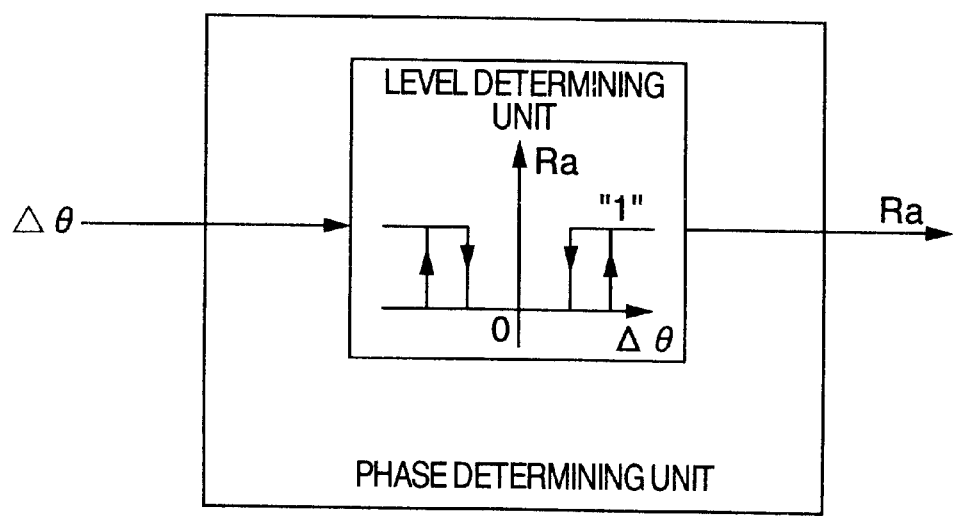
FIG. 3 is an explanatory diagram of a phase determining unit in accordance with the first embodiment.

FIG. 3 shows the details of the phase determining unit. The phase difference signal Δθ outputted from the phase detector is inputted to a level determining unit, and when Δθ is a value in the neighborhood of zero which does not affect the converter and the load at the time of closing the circuit breaker, the system interconnection allowance signal Ra is set to a "0," and is outputted to the self commutating/abnormality determining unit. Here, as for the level for determining the phase difference, if, for example, the phase difference between the system voltage Vs and the converter voltage Vc is A, and the reactance from the power system to the converter is X, power P which is determined from the following formula (1) is absorbed or released between the converter and the system when the circuit breaker is closed. Hence, such a phase difference A that this power Po becomes sufficiently small with respect to the converter capacity is selected to minimize the effect on the converter.

$$Po = Vs \cdot Vc \cdot \sin A / X [W] \quad (1)$$

In addition, the aforementioned determining level may be provided with hysteresis to prevent the interconnection allowance signal Ra of the output from repeating the values of "1" and "0" step by step in a case where the value of Δθ is close to the value of a phase difference A in the aforementioned determining level.

Figure 4:
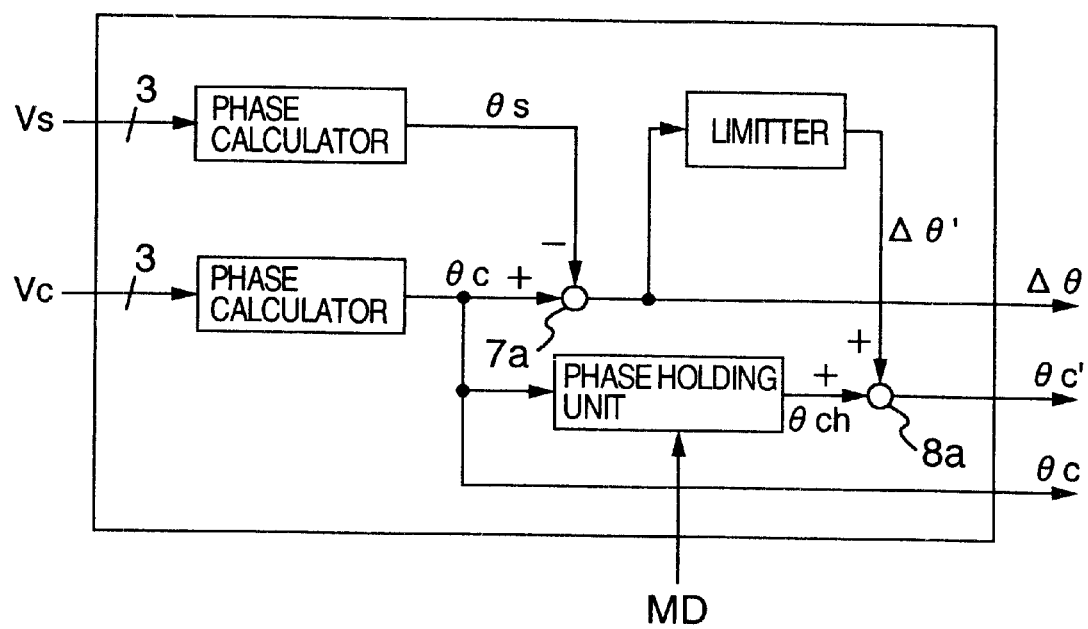
FIG. 4 is a an explanatory diagram of a phase detector in accordance with the first embodiment.

FIG. 4 shows the details of the phase detector. As for the phase signal θc detected from the output voltage Vc of the converter by a phase calculator, the difference between the same and the phase signal Δs detected from the system voltage Vs by a phase calculator is calculated by a subtractor 7a, and the calculated phase difference Δθ is outputted to the phase determining unit. Further, the phase signal θc is outputted to the converter controller, and is inputted to a phase holding unit as well. The self commutating allowance signal MD is inputted to the phase holding unit, and when the self commutating allowance signal MD indicates the self commutated operation, the mode shifts to a self-oscillation mode at a system frequency at the phase persisting at that point of time, and the phase holding unit outputs a phase signal θch to an adder 8a. Further, the phase difference Δθ is inputted to the limiter, which in turn limits a correction amount Δθ with a phase difference corresponding to a frequency variation allowed for the system, and outputs a limited value Δθ ' to the adder 8a. The adder 8a adds the phase signals θch and Δθ', and outputs the added result θc' to the converter controller.

A description will be given of the phase calculator. The term sin(ω·t+φ) out of cos(ω·t+φ) and sin(ω·t+100 ), which are the results obtained by subjecting the system voltage Vc to three-phase/two-phase transformation, is calculated in accordance with expressions of Fourier transformation shown in formulae (2) and (3) so as to obtain VaR and VaI. Similarly, cos(ω·t+φ) is calculated in accordance with expressions of Fourier transformation shown in formulae (4) and (5) so as to obtain VbR and VbI. It should be noted that cos(ω·t) and sin(ω·t) are internal oscillation signals, t is the time, and φ is the phase difference with an internal oscillator.

$$VaR = \int_O^T [\cos\{\omega \cdot t\} \times \sin\{\omega \cdot t + \phi\}] dt \qquad (2)$$
$$= \frac{1}{2} \int_O^T [\sin\{2\omega \cdot t + \phi\} + \sin\{\phi\}] dt$$
$$= \frac{1}{2} \cdot \frac{1}{2\omega} [-\cos\{2\omega \cdot t + \phi\} + t \cdot \sin\{\phi\}]_O^T$$
$$= \frac{1}{4\omega} [-\cos\{2\omega \cdot T + \phi\} + T \cdot \sin\{\phi\}] - \frac{1}{4\omega} [-\cos\{\phi\}]$$
$$= \frac{T}{4\omega} \sin\{\phi\}$$

$$VaI = \int_O^T [\sin\{\omega \cdot t\} \times \sin\{\omega \cdot t + \phi\}] dt \qquad (3)$$
$$= -\frac{1}{2} \int_O^T [\cos\{2\omega \cdot t + \phi\} - \cos\{\phi\}] dt$$
$$= \frac{1}{2} \cdot \frac{1}{2\omega} [\sin\{2\omega \cdot t + \phi\} - t \cdot \cos\{\phi\}]_O^T$$
$$= \frac{-1}{4\omega} [\sin\{2\omega \cdot T + \phi\} - T \cdot \cos\{\phi\}] + \frac{1}{4\omega} [\sin\{\phi\}]$$
$$= \frac{T}{4\omega} \cos\{\phi\}$$

$$VbR = \int_O^T [\cos\{\omega \cdot t\} \times \cos\{\omega \cdot t + \phi\}] dt \qquad (4)$$
$$= \frac{1}{2} \int_O^T [\cos\{2\omega \cdot t + \phi\} + \cos\{-\phi\}] dt$$
$$= \frac{1}{2} \cdot \frac{1}{2\omega} [\sin\{2\omega \cdot t + \phi\} + t \cdot \cos\{-\phi\}]_O^T$$
$$= \frac{1}{4\omega} [\sin\{2\omega \cdot T + \phi\} + T \cdot \cos\{-\phi\}] - \frac{1}{4\omega} [\sin\{\phi\}]$$
$$= \frac{T}{4\omega} \cos\{\phi\}$$

$$VbI = \int_O^T [\sin\{\omega \cdot t\} \times \cos\{\omega \cdot t + \phi\}] dt \qquad (5)$$
$$= \frac{1}{2} \int_O^T [\sin\{2\omega \cdot t + \phi\} + \sin\{-\phi\}] dt$$
$$= \frac{1}{2} \cdot \frac{1}{2\omega} [-\cos\{2\omega \cdot t + \phi\} + t \cdot \sin\{-\phi\}]_O^T$$
$$= \frac{1}{4\omega} [-\cos\{2\omega \cdot T + \phi\} + T \cdot \sin\{-\phi\}] - \frac{1}{4\omega} [-\cos\{\phi\}]$$
$$= \frac{-T}{4\omega} \sin\{\phi\}$$

Further, the obtained results are calculated in accordance with formulae (6) and (7) to obtain VR and VI.

$$VR=VaR+VbI \qquad (6)$$

$$VI=VbR-VaI \qquad (7)$$

The calculated results VR and VI are 5 transformed into ac signals Vcos and Vsin by using the phases cos(ω·t) and sin(ω·t) of the internal oscillators through coordinate transformation using formula (8).

$$\begin{bmatrix} V\cos \\ V\sin \end{bmatrix} = \begin{bmatrix} +VR \cdot \cos(\omega \cdot t) + VI \cdot \sin(\omega \cdot t) \\ -VR \cdot \sin(\omega \cdot t) + VI \cdot \cos(\omega \cdot t) \end{bmatrix} \qquad (8)$$

Further, the phase angle θc is calculated in accordance with an arithmetic expression shown in formula (9).

$$\theta c=Atan(Vsin/Vcos) \qquad (9)$$

The phase signal θs of the system voltage Vs is also determined in the same way as described above.

Figure 5:
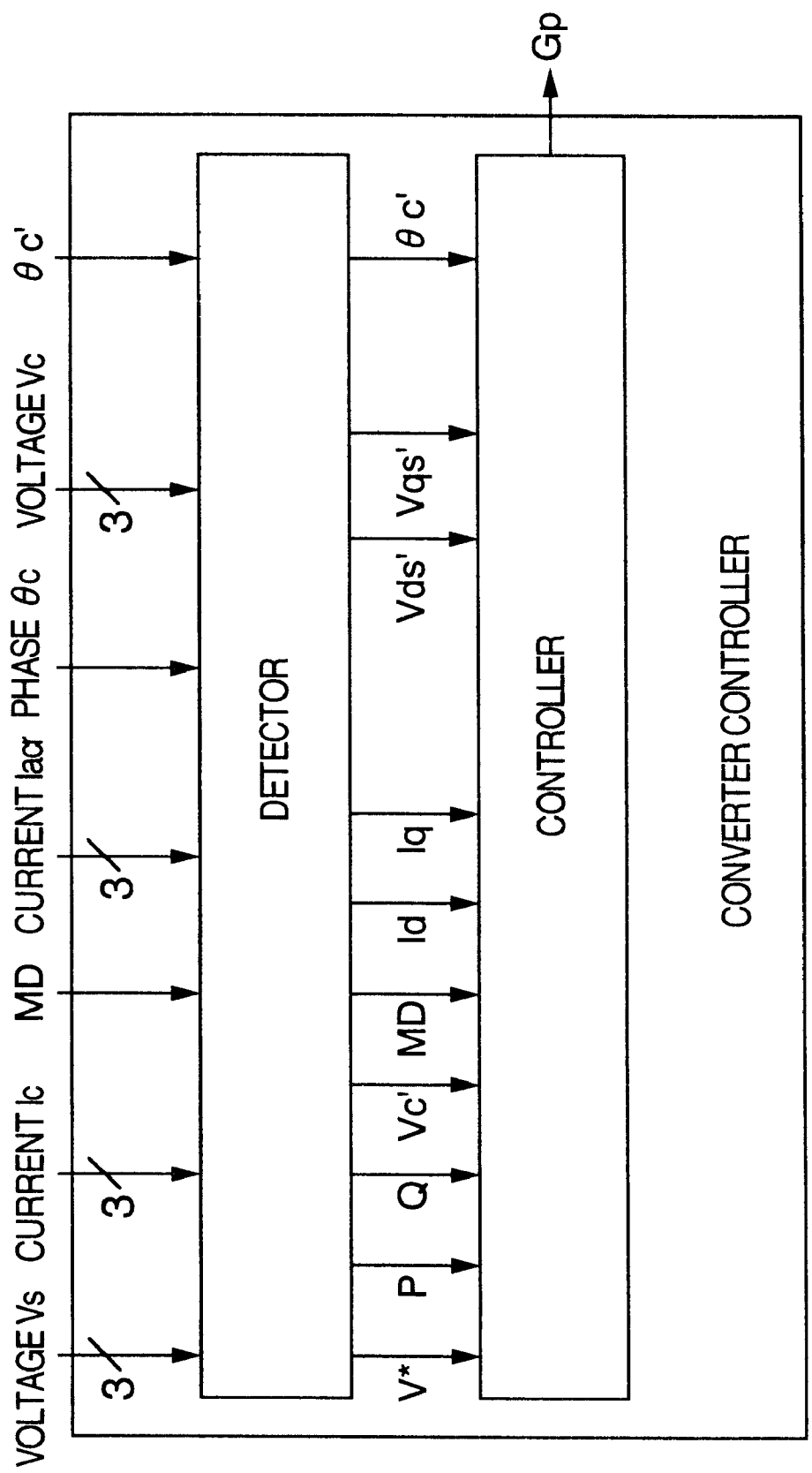
FIG. 5 is an explanatory diagram of a converter controller in accordance with the first embodiment.

FIG. 5 shows the configuration of the converter controller in accordance with this embodiment. In addition, FIG. 6 shows the details of the detector of the converter controller, and FIG. 7 shows the details of the controller of the converter controller.

Figure 6:
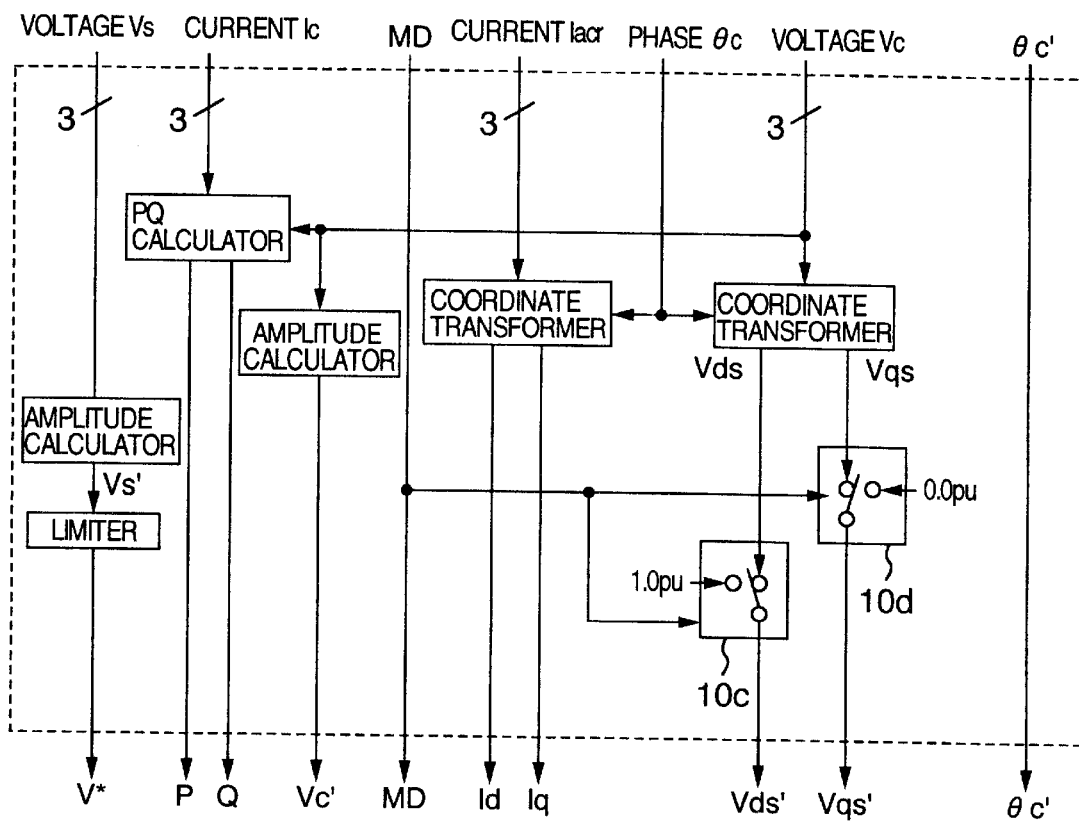
FIG. 6 is an explanatory diagram of a detector of the converter controller in accordance with the first embodiment.
Figure 7:
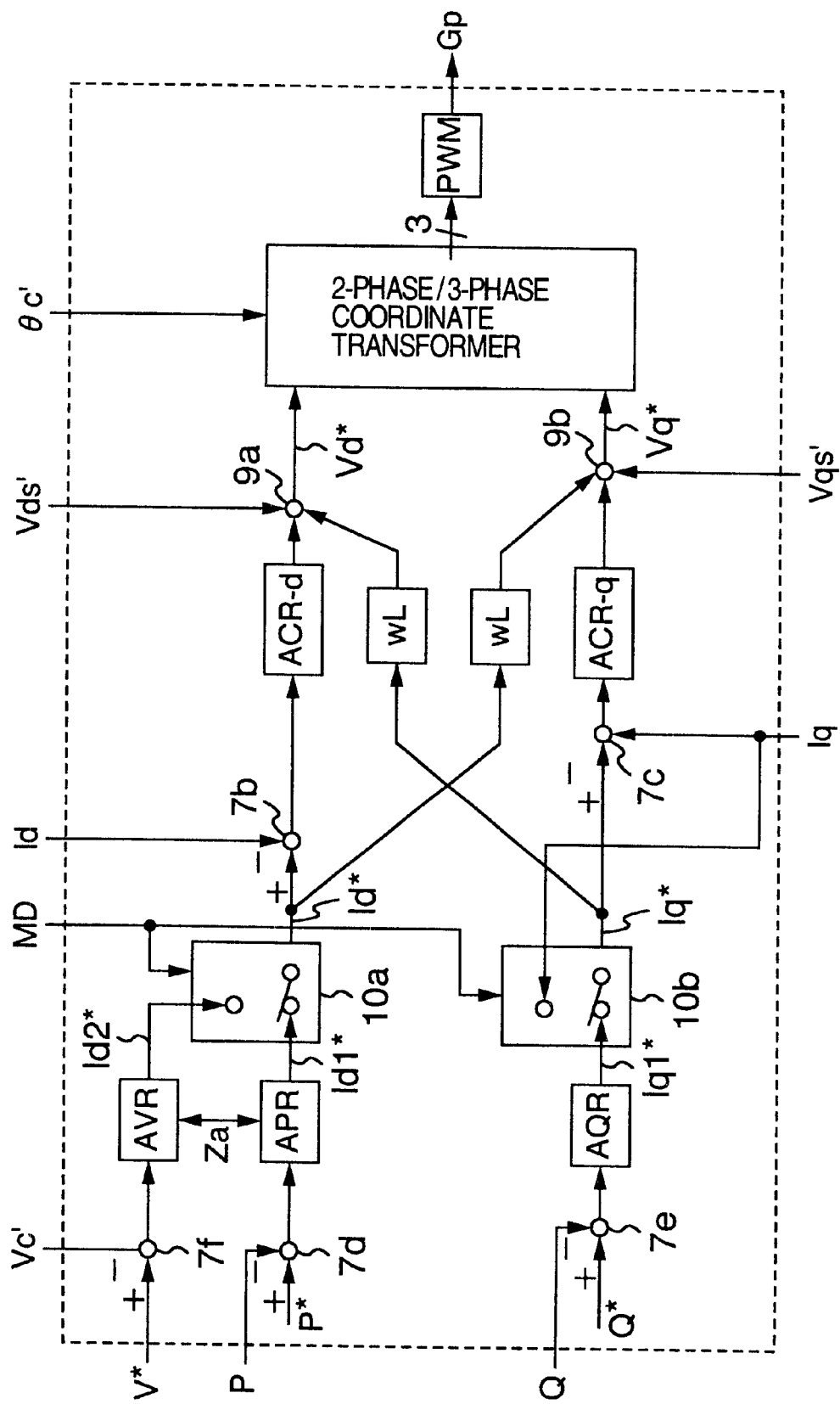
FIG. 7 is an explanatory diagram of a controller of the converter controller in accordance with the first embodiment.

As shown in FIG. 6, the converter controller calculates active power P and reactive power Q being outputted to the system by a PQ calculator on the basis of the current detection value Ic and the voltage detection value Vc. The active power P and the reactive power Q thus obtained are respectively inputted to an active power regulator APR and a reactive power regulator AQR shown in FIG. 7, and the active power regulator APR and the reactive power regulator AQR calculate current command values Id1* and Iq1* to allow the active power P and the reactive power Q to agree with command values P* and Q*, outputs them to switchers 10a and 10b, respectively. In addition, a voltage amplitude detection value Vs' at the tie point of the converter is calculated by being inputted to an amplitude calculator shown in FIG. 6, and is outputted to a limiter. An amplitude value Vc' of the output voltage Vc of the converter is also calculated by another amplitude calculator shown in FIG. 6, and is inputted to a subtractor 7f as a feedback signal for an automatic voltage regulator AVR shown in FIG. 7. The voltage amplitude detection value Vs' is inputted to the limiter shown in FIG. 6, and the limiter limits the voltage amplitude detection value Vs' within a rated range of the system voltage and outputs it to a filter (not shown). A voltage amplitude V* without a high-frequency component removed by the filter is outputted to the subtractor 7f so as to be used as a command value for the voltage regulator AVR. The subtractor 7f outputs the result of calculation to the voltage regulator AVR, and an output Id2* of the voltage regulator AVR is inputted to a switcher 10a. In addition, a q-axis component Iq of the current feedback is inputted to a switcher 10b, and the switcher 10b outputs either Iq or Iq1*.

In addition, an integral value which is held in the active power regulator APR and an integral value which is held in the voltage regulator AVR use a common memory Za, and a setting is provided such that the integral value not being used for control agrees with the integral value being used for control.

The phase signal θc is inputted to a coordinate transformer at the current Iacr and a coordinate transformer at the voltage Vc shown in FIG. 6. Each coordinate transformer transforms the three-phase ac signal into two-axis dc quantities from the phase signal θc, and transforms the current Iacr into Id and Iq and the voltage Vc into Vds and Vqs. The d-axis component Vds and the q-axis component Vqs of the voltage are respectively inputted to switchers 10c and 10d. Inputted to the switchers 10c and 10d are fixed values of the magnitude (1.0 pu) of the d-axis component and the magnitude (0.0 pu) of the q-axis component of the voltage detection value to be normally detected in the grid connected operation. If it is assumed that output signals of the respective switchers 10c and 10d are Vds' and Vqs', either Vds and Vqs or 1.0 pu and 0.0 pu are outputted as outputs.

Outputs Id* and Iq* of the switcher 10a and the switcher 10b shown in FIG. 7 are respectively inputted to subtractors 7b and 7c, differences between the same and the feedback values Id and Iq of the current Iacr are calculated by the subtractors 7b and 7c, and the results are respectively outputted to a d-axis current regulator ACRd and a q-axis current regulator ACRq. In addition, the outputs Id* and Iq* of the switchers 10a and 10b are respectively outputted to noninterfering-component calculators wL. The outputs from the current regulator ACRd and the current regulator ACRq are respectively inputted to an adder-subtractor 9a and an adder-subtractor 9b. In addition, the noninterfering-component calculator wL calculates a noninterfering component from the q-axis current command value Iq*, and outputs it to the adder-subtractor 9a. Similarly, the noninterfering-component calculator wL calculates a non-interfering component from the d-axis current command value Id*, and outputs it to the adder-subtractor 9b.

Further, the adder-subtractors 9a and 9b respectively add the d-axis component Vds' and the q-axis component Vqs' of the voltage detection value, and output the results of the arithmetic operation, Vd* and Vq*, to a two-phase/three-phase coordinate transformer. The two-phase/three-phase coordinate transformer transforms the signals Vd* and Vq* inputted by using the phase signal θc' into a three-phase alternating current, and outputs it to a PWM computing unit. The PWM computing unit subjects the output from the two-phase/three-phase coordinate transformer to a PWM operation, and outputs a gate pulse Gp. Thus, since the two-phase/three-phase coordinate transformer effects transformation into a three-phase alternating current by using θc' which is the sum of θch and Δθc', i.e., Δθ whose value has been limited by the limiter, it is possible to adjust the output phase of the converter so as to eliminate Δθ.

The self commutating allowance signal MD is inputted to the switchers 10a and 10b shown in FIG. 7 and the switchers 10c and 10d shown in FIG. 6. When the self commutating allowance signal MD is set to self commutated operation, the switcher 10a selects Id2* as Id*, the switcher 10b selects Iq as Iq*, the switcher 10c uses the fixed value of 1.0 pu for Vds' to fix a feedforward component of the voltage, and the switcher 10d uses the fixed value of 0.0 pu for Vqs'.

In this embodiment, since the voltage Vs on the system side of the circuit breaker 3a is inputted to the phase detector 3a, the output phase of the converter system can be adjusted in such a manner as to coincide with the phase of the system when the system voltage has returned during self commutated operation. Accordingly, in this embodiment, an overcurrent of the converter and an effect on the load are small when the system voltage has returned during self commutated operation. In addition, since the circuit breaker 3a can be closed by directly operating the converter system when the phases have coincided with each other, equipment such as an interconnection protector is not required.

In this embodiment, since part of the output of the phase detector is merely held during transfer to self commutated operation, and the coordinate transformation in current detection uses the signal from the phase detector as it is, the phase detection signal does not change abruptly during a shift to self commutated operation or a return to system inter-connection, so that the converter can be controlled stably.

In this embodiment, the current control system is used in common for the grid connected operation and the self commutated operation, so that it is possible to suppress sudden fluctuations in the controlled variables. In addition, since current control is used at the time of self commutated operation, in a case such as where the load has fluctuates and exceeds the capacity of the converter, it is possible to prevent an overcurrent by the operation of the limiter in current control.

In this higher embodiment, higher harmonics can be reduced by fixing the feedforward components Vds and Vqs of the converter voltage during self commutated operation.

In this embodiment, by using one (in this embodiment, d-axis) command value for current control as an output of voltage control, by setting the other input deviation for current control to zero, and by using a phase detection signal in coordinate transformation in current detection, a changeover to control of self commutated operation becomes possible while using the conventional current vector control. Further, by using the self-oscillated phase signal θc' in the two-phase/three-phase coordinate transformation, the output voltage frequency during self commutated operation can be stabilized.

In this embodiment, since integral quantities of the active power regulator APR and the voltage regulator AVR are made to conform to the integral quantity of the side in use, a changeover can be effected stably without sudden fluctuations in the controlled variables at the time of the changeover.

In this embodiment, since the amount of correction of the phase difference Δθ is provided with a limit, and the phase is adjusted with an amount of phase correction falling within an amount corresponding to the portion of frequency variation allowed for the system, a return is possible from self commutated operation to grid connected operation while suppressing the frequency variation of the load to a minimum.

In this embodiment, since the system-side voltage Vs of the circuit breaker is used as the voltage command value V* of the voltage regulator AVR, and a limiter within the allowable range of the voltage which is determined by the system is provided to use its output as a command value, when the system voltage has dropped during self commutated operation, a lower limit of the limit serves as a voltage command value, while when the system voltage has returned, the voltage of the self commutated system can be made to agree with the voltage of the system.

Next, a description will be given of another embodiment of the invention. It should be noted that equivalent component elements throughout the drawings will be denoted by the same reference numerals, and a detailed description thereof will be omitted.

(Second Embodiment)

Figure 8:
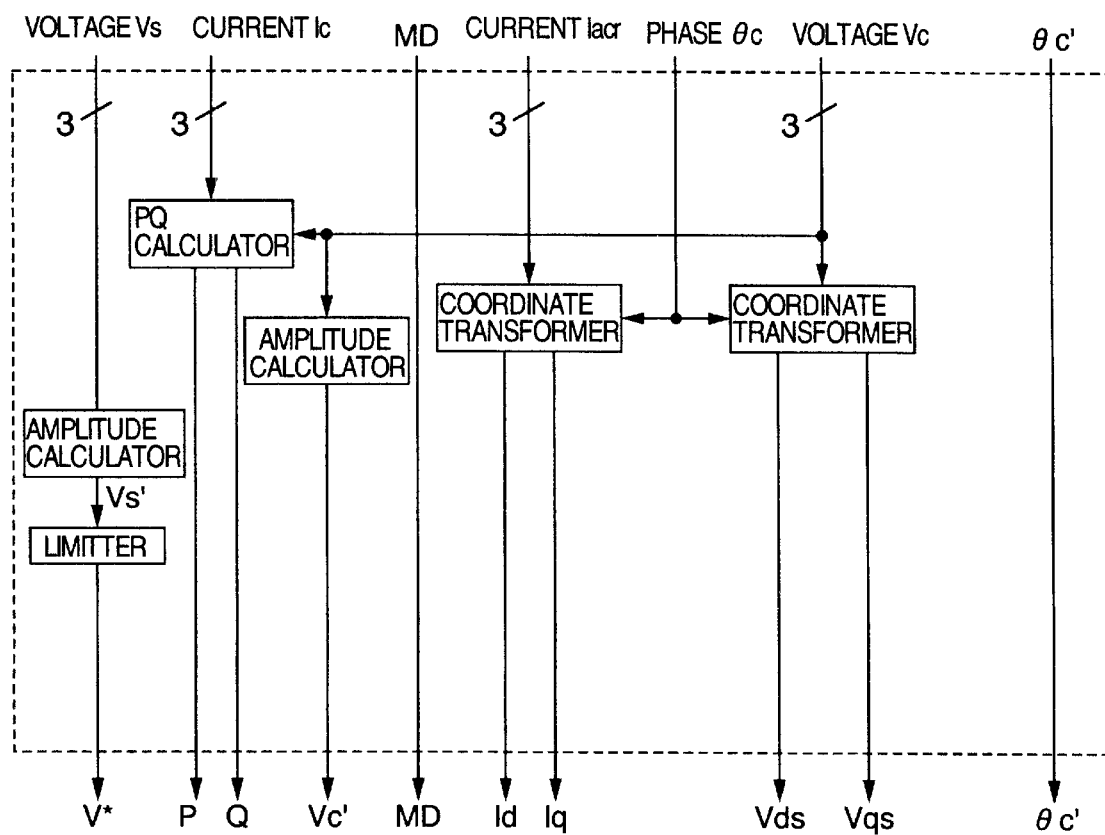
FIG. 8 is an explanatory diagram of the detector of a converter controller in accordance with a second embodiment.
Figure 9:
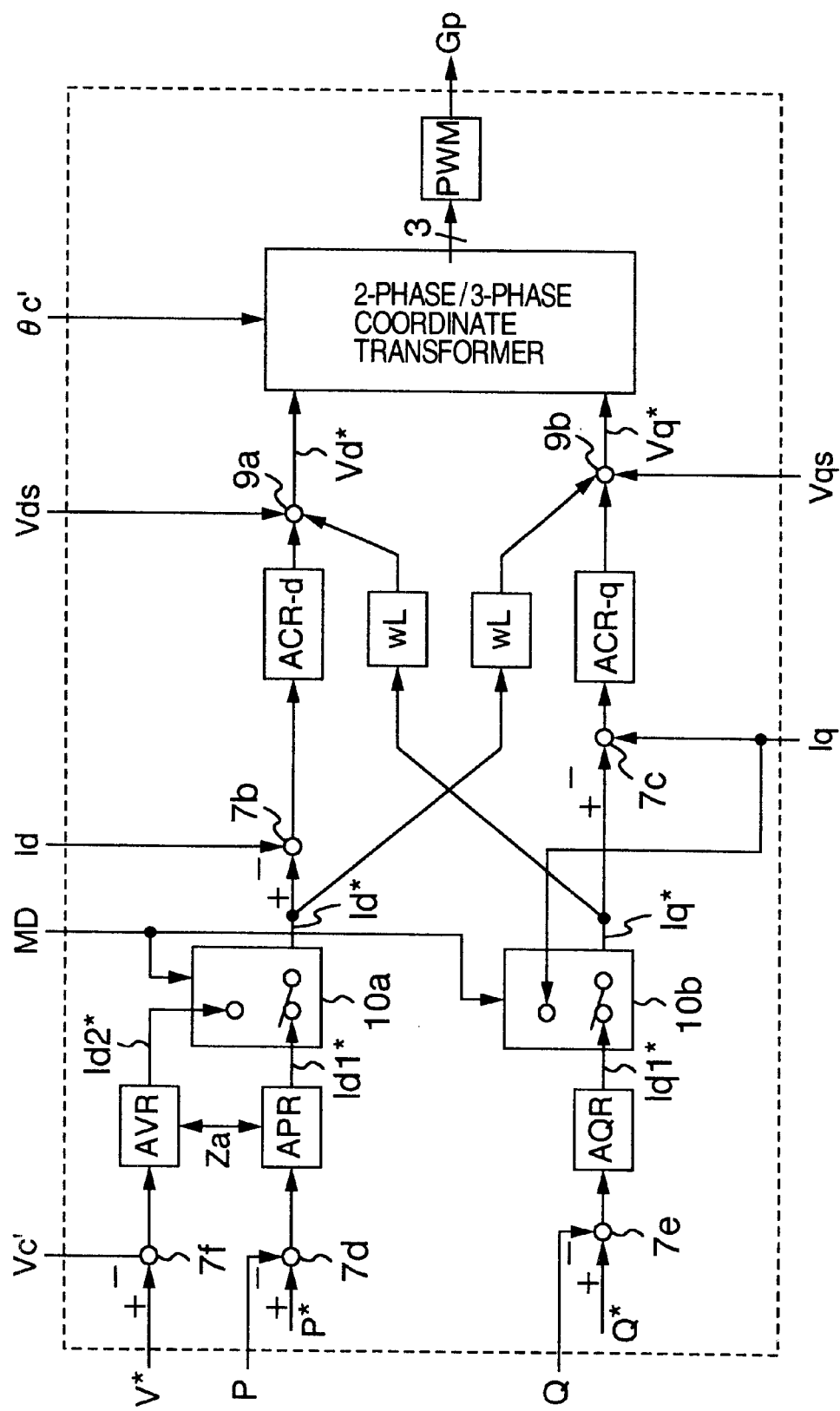
FIG. 9 is an explanatory diagram of a controller of the converter controller in accordance with the second embodiment.

FIGS. 8 and 9 respectively illustrate a detector and a controller of the converter controller 40 in accordance with a second embodiment of the invention. In this embodiment, unlike the first embodiment, feedforward detection values Vds and Vqs of the voltage of the converter controller are also used during self commutated operation as during grid connected operation. In accordance with this embodiment, in addition to advantages similar to those of the first embodiment, since feedforward detection values of the voltage are constantly used, it is possible to follow at high speed a voltage fluctuation when an accident or the like has occurred in a transmission line during self commutated operation, and it is possible to prevent an overcurrent in the converter.

(Third Embodiment)

Figure 10:
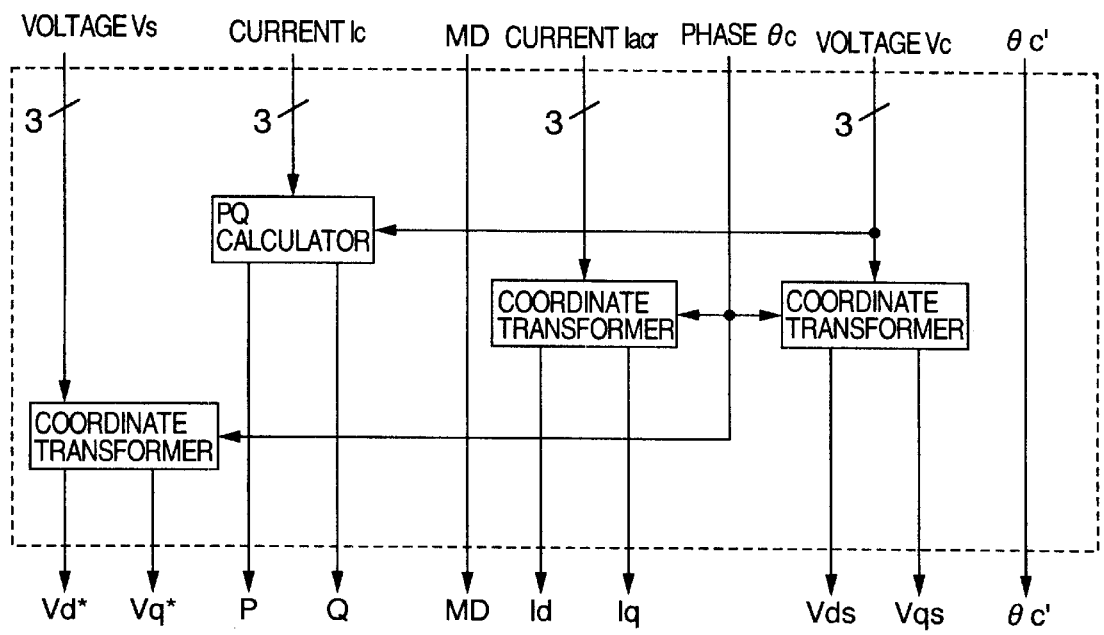
FIG. 10 is an explanatory diagram of a detector in accordance with a third embodiment.
Figure 11:
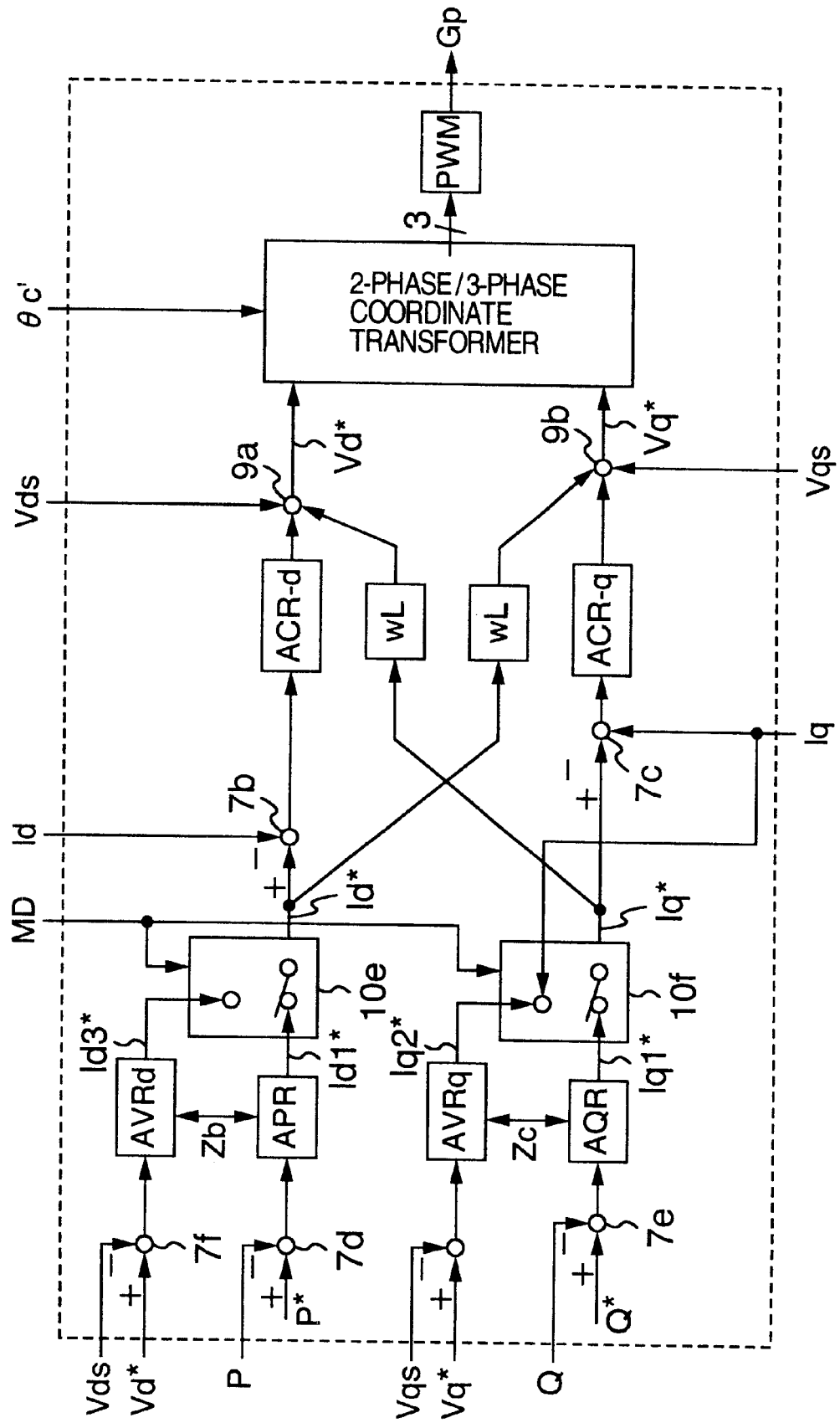
FIG. 11 is an explanatory diagram of a controller in accordance with the third embodiment.

FIGS. 10 and 11 respectively illustrate a detector and a controller of the converter controller 40 in accordance with a third embodiment of the invention. In this embodiment, the configuration of the converter controller of the first embodiment during self commutated operation is different. A d-axis voltage regulator AVRd is used instead of the active power regulator APR, and a q-axis voltage regulator AVRq is used instead of the reactive power regulator AQR.

In accordance with this embodiment, in addition to advantages similar to those of the first embodiment, since both the d-axis component and the q-axis component can be controlled by the current regulator, there is an advantage in suppressing an overcurrent.

(Fourth Embodiment)

Figure 12:
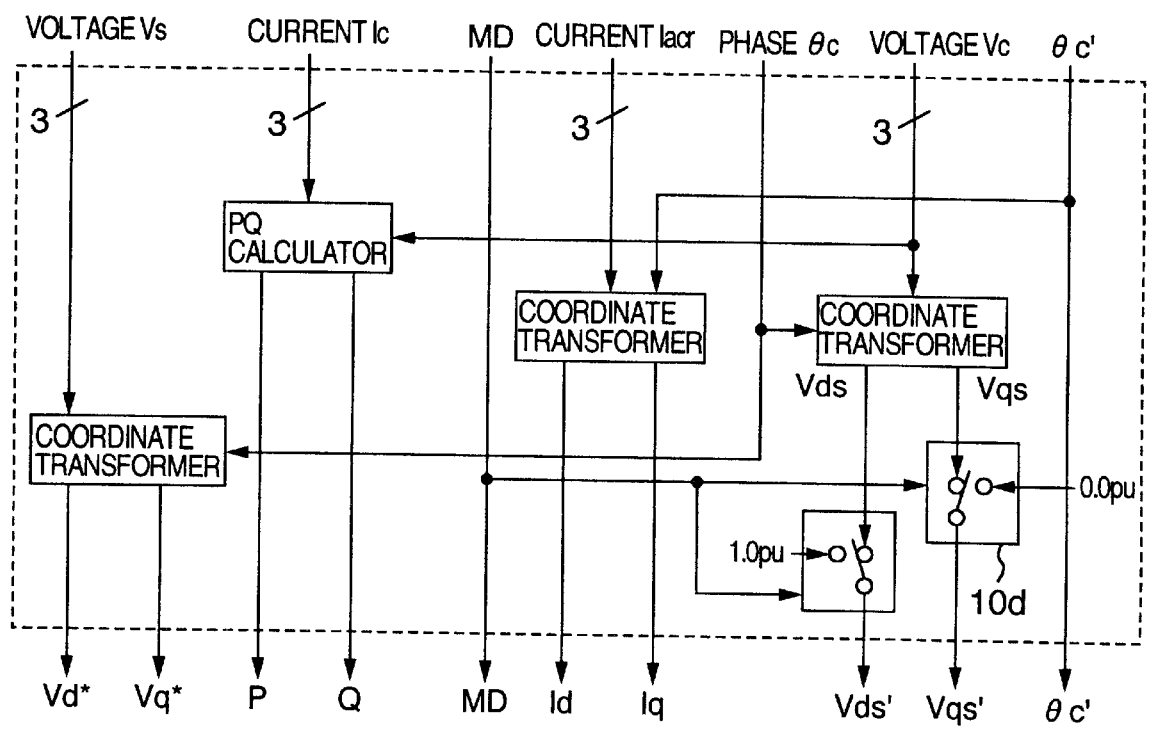
FIG. 12 is an explanatory diagram of a detector in accordance with a fourth embodiment.
Figure 13:
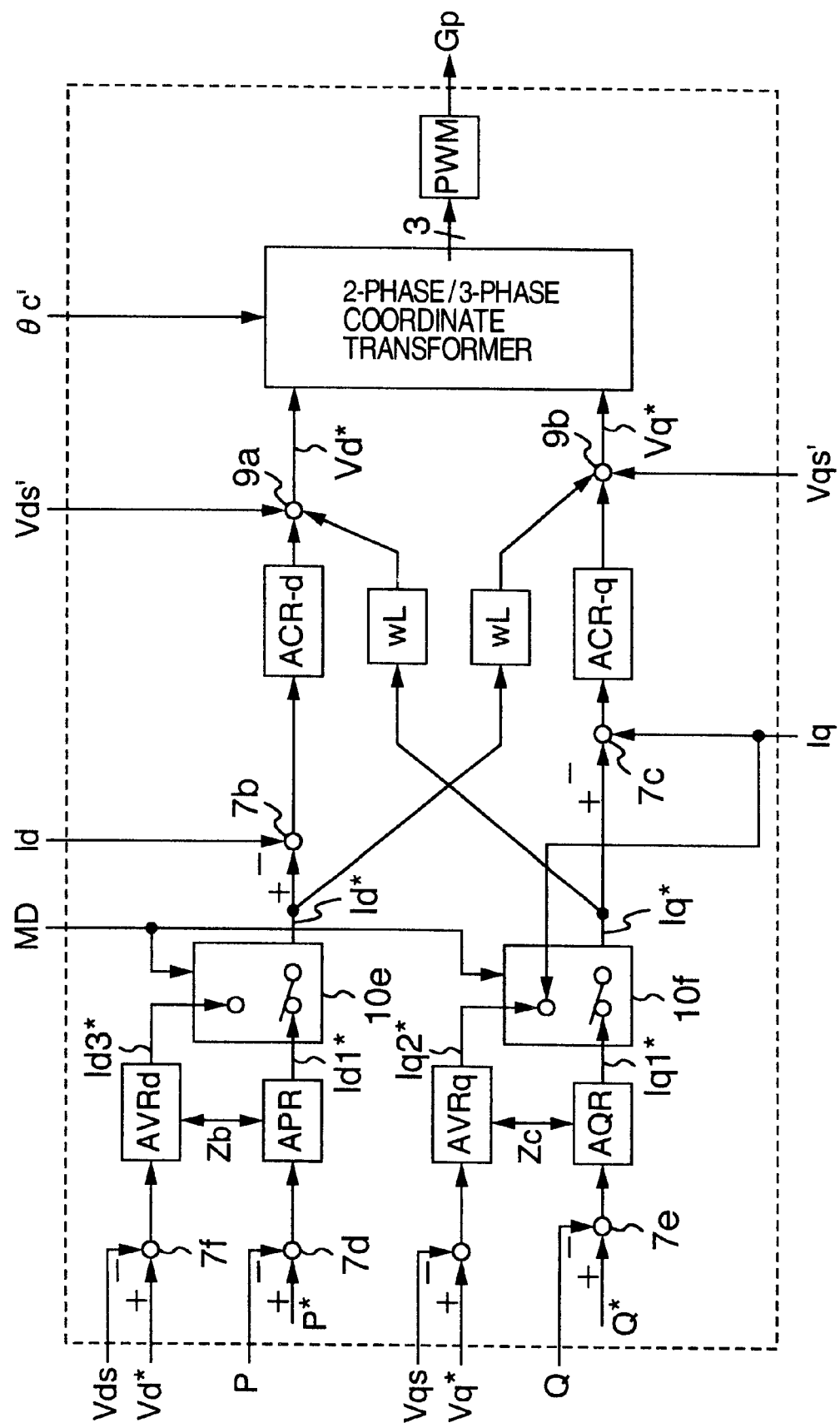
FIG. 13 is an explanatory diagram of a controller in accordance with the fourth embodiment.

FIGS. 12 and 13 respectively illustrate a detector and a fourth of the converter controller 40 in accordance with a third embodiment of the invention. In this embodiment, the configuration of the converter controller of the third embodiment during self commutated operation is different, and the fixed phase θc' is used in the coordinate transformation of the current as well. In accordance with this embodiment, in addition to advantages similar to those of the first embodiment, since both the d-axis component and the q-axis component can be controlled by the current regulator, there is an advantage in suppressing an overcurrent.

(Fifth Embodiment)

Figure 14:
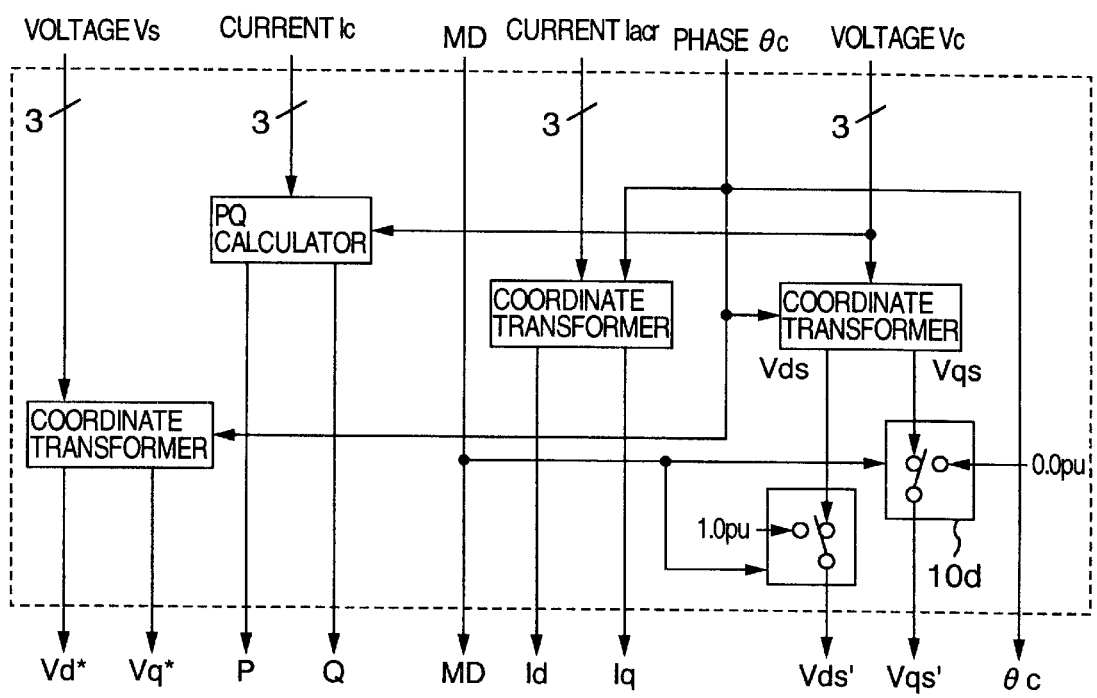
FIG. 14 is an explanatory diagram of a detector in accordance with a fifth embodiment.
Figure 15:
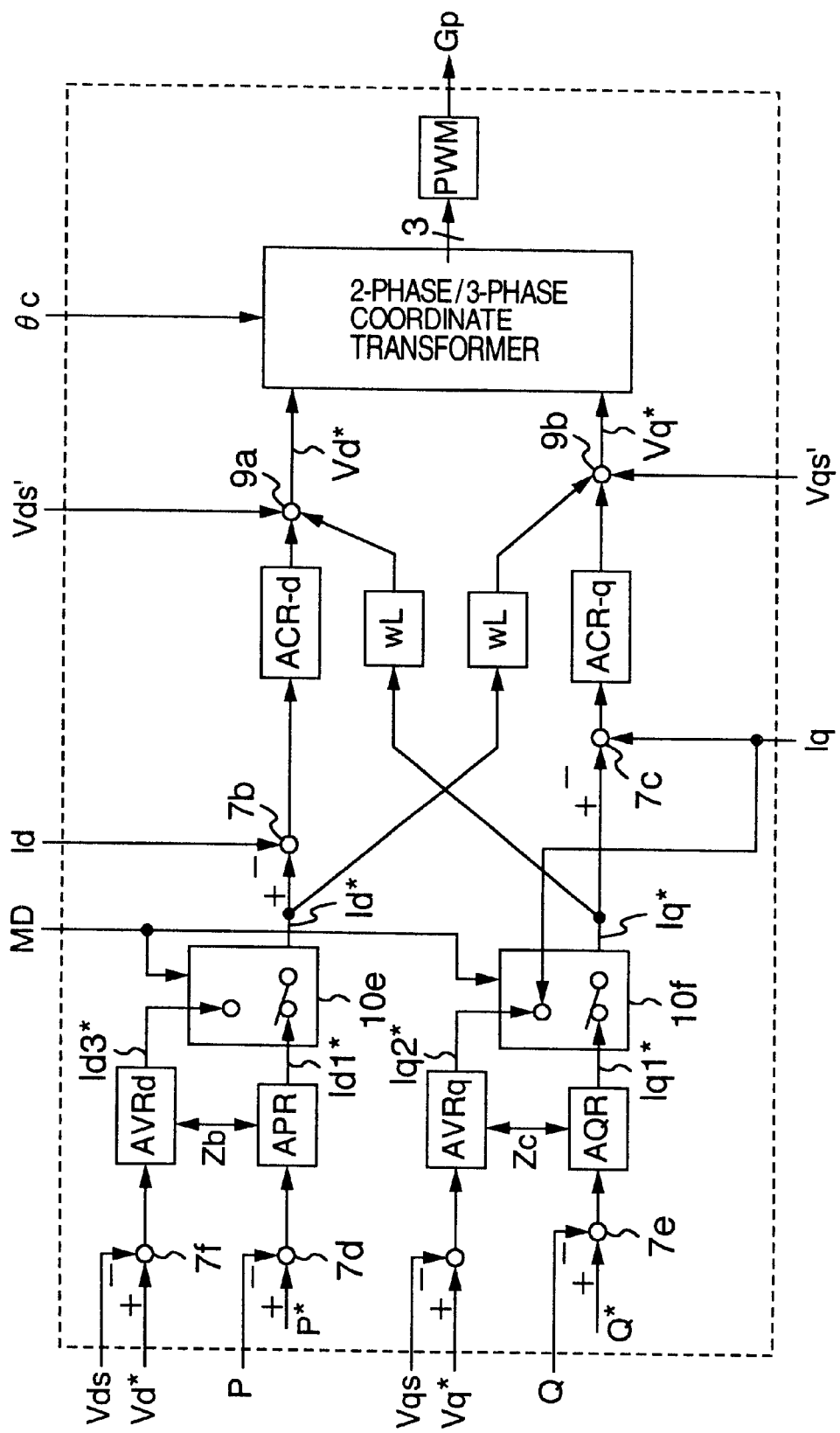
FIG. 15 is an explanatory diagram of a controller in accordance with the fifth embodiment.

FIGS. 14 and 15 respectively illustrate a detector and a controller of the converter controller 40 in accordance with a fifth embodiment of the invention. In this embodiment, the configuration of the converter controller of the third embodiment during self commutated operation is different, and the phase detection signal θc is used as the reference phase for two-phase/three-phase transformation. In accordance with this embodiment, in addition to advantages similar to those of the first embodiment, since both the d-axis component and the q-axis component can be controlled by the current regulator, there is an advantage in suppressing an overcurrent.

(Sixth Embodiment)

Figure 16:
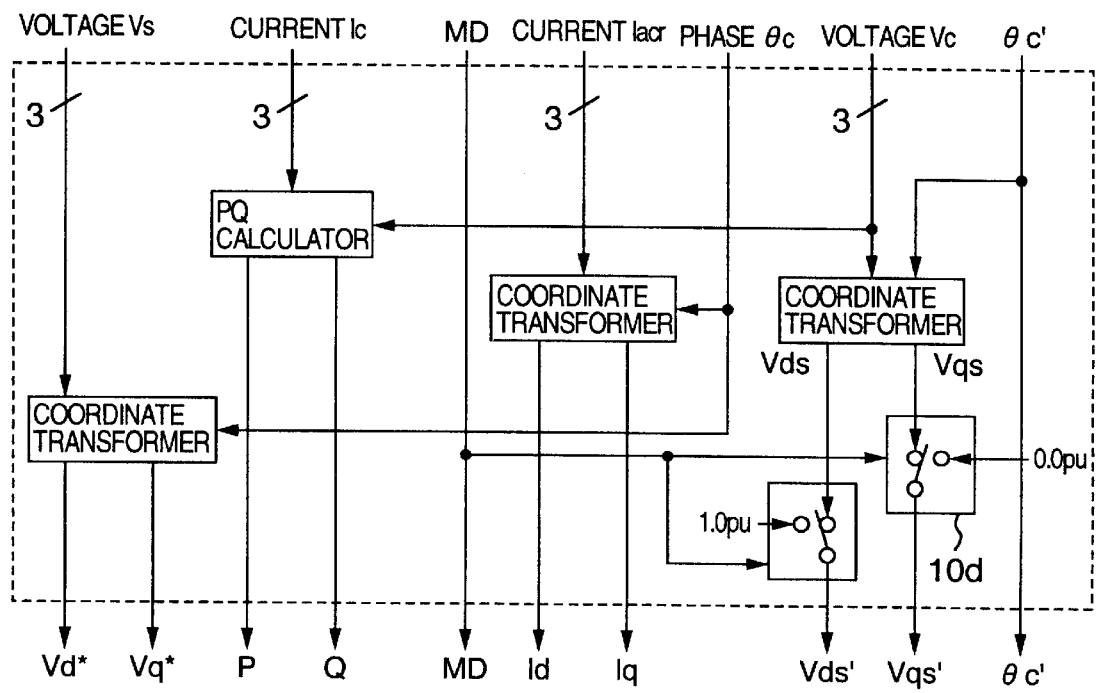
FIG. 16 is an explanatory diagram of a detector in accordance with a sixth embodiment.
Figure 17:
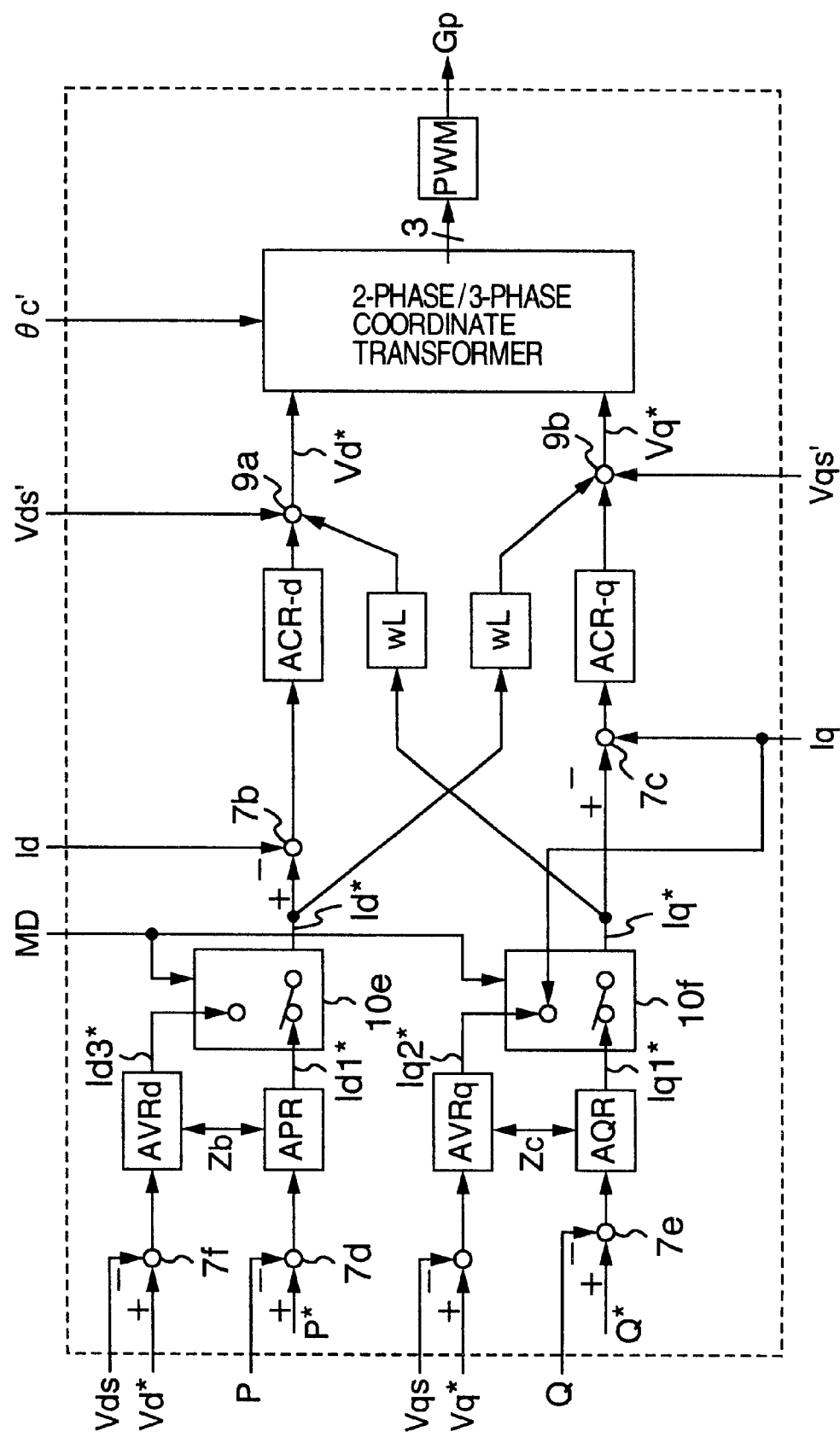
FIG. 17 is an explanatory diagram of a controller in accordance with the sixth embodiment.

FIGS. 16 and 17 respectively illustrate a detector and a controller of the converter controller 40 in accordance with a sixth embodiment of the invention. In this embodiment, the configuration of the converter controller of the third embodiment during self commutated operation is changed, and the fixed signal θc' is used as the reference phase signal for coordinate conversion for calculating a feedforward component of the voltage. In accordance with this embodiment, in addition to advantages similar to those of the first embodiment, since both the d-axis component and the q-axis component can be controlled by the current regulator, there is an advantage in suppressing an overcurrent.

(Seventh Embodiment)

Figure 18:
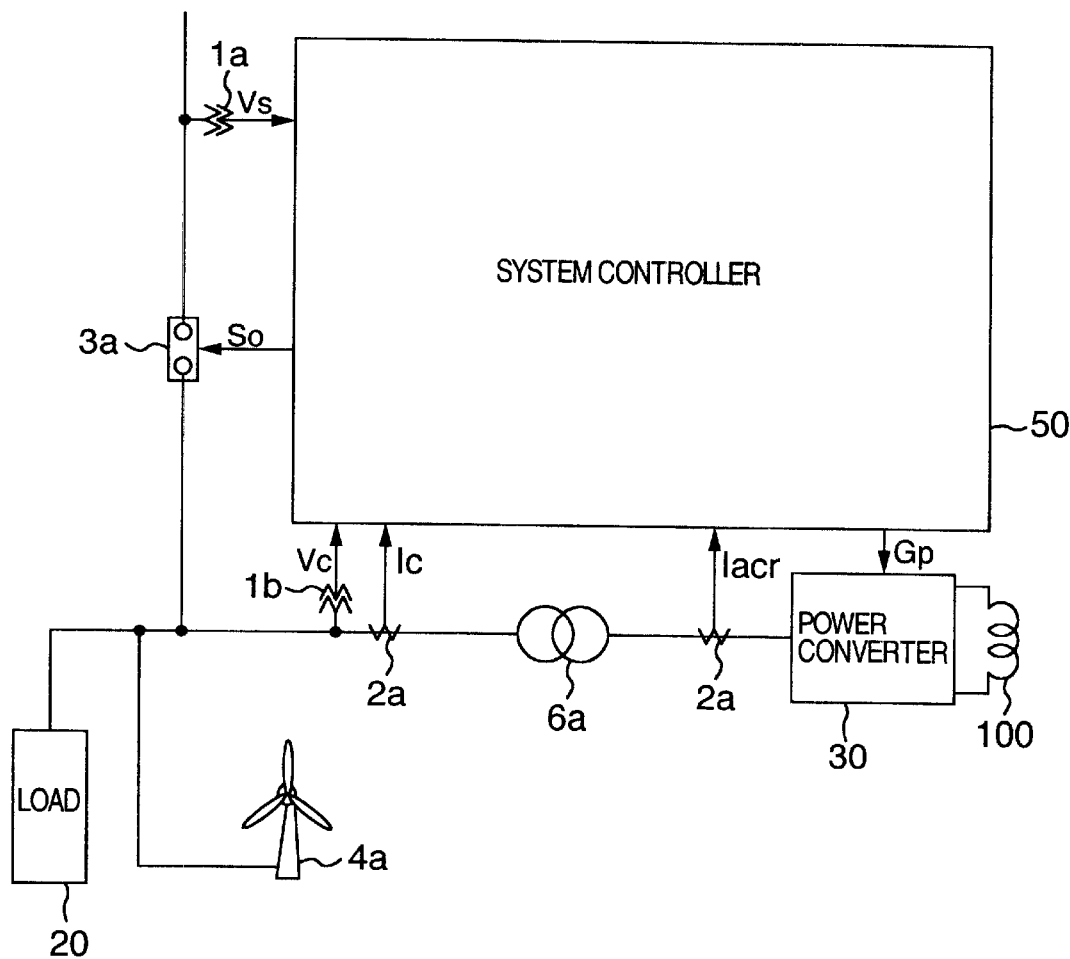
FIG. 18 is an explanatory diagram of a seventh embodiment.

In a seventh embodiment, a superconductive energy storage system is provided instead of the secondary battery 5a of the first embodiment, as shown in FIG. 18. A superconductive coil 100 is installed in a dc portion of the power converter 30, and the superconductive energy storage system transmits and receives electric power to and from the system in response to commands from the system controller 50. In this embodiment, self commutated operation of the superconductive energy storage system is made possible.

(Eighth Embodiment)

Figure 19:
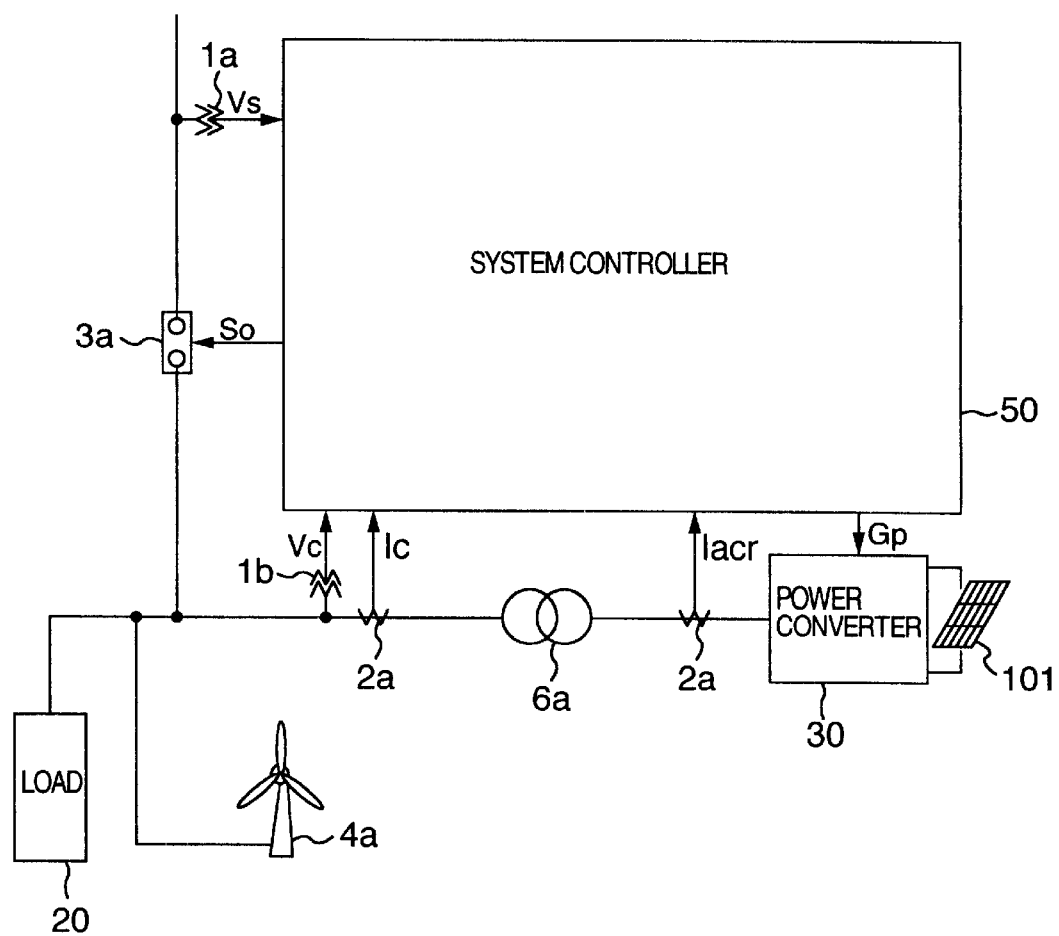
FIG. 19 is an explanatory diagram of an eighth embodiment in which a photovoltaic power generator is provided.

In an eighth embodiment, a photovoltaic power generator is provided instead of the secondary battery 5a of the first embodiment, as shown in FIG. 19. A solar cell panel 101 is installed in a dc portion of the converter 30 of the photovoltaic power generator, and releases electric power to the system in response to a command from the system controller 50.

(Ninth Embodiment)

Figure 20:
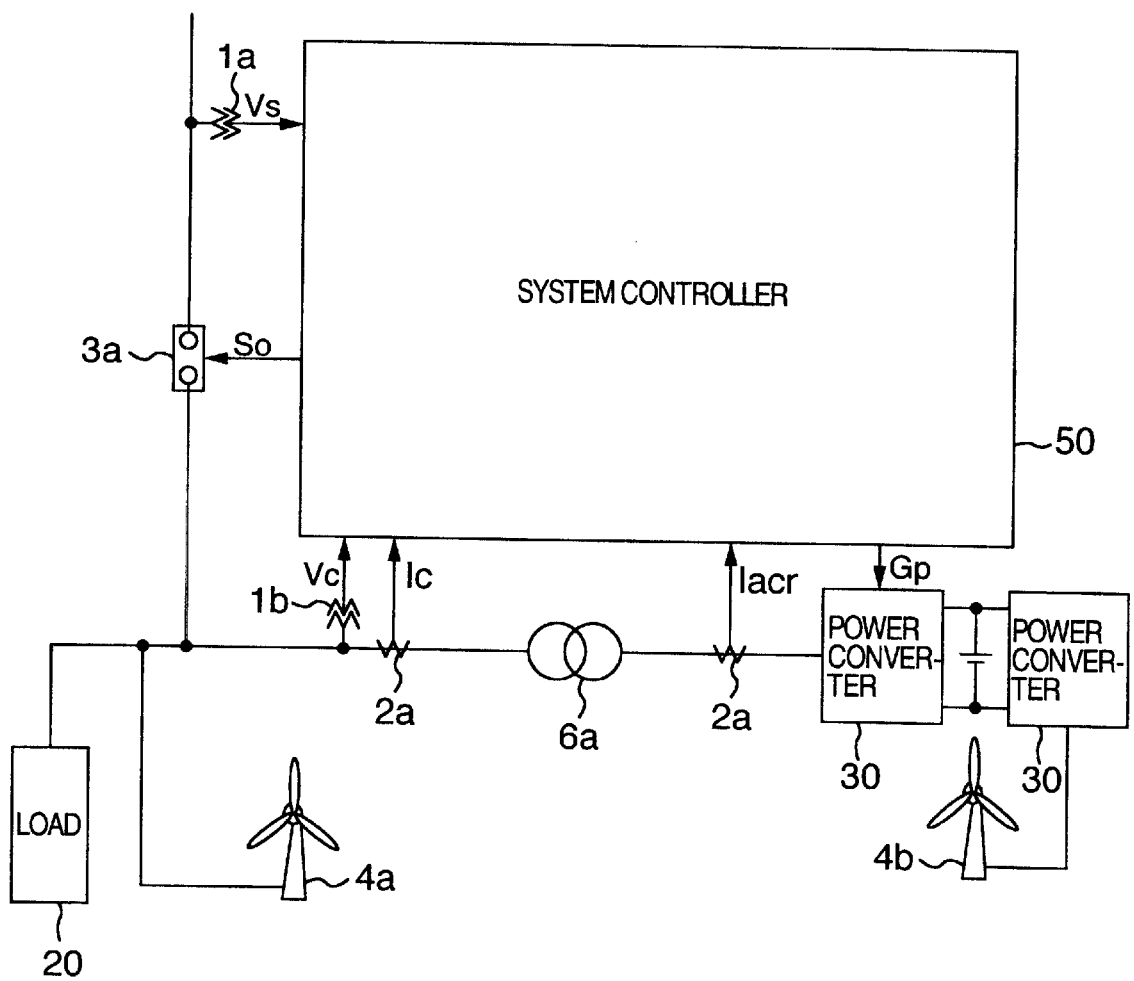
FIG. 20 is an explanatory diagram of a ninth embodiment in which a wind power generation system having an inverter and a converter is provided.

In a ninth embodiment, a wind power generation system 4b having an inverter and a converter is provided, as shown in FIG. 20. Dc portion of the inverter and the converter are used in common, and the secondary battery 5a for storing electric energy is installed. Electric power is absorbed from or released to the system in response to a command from the system controller 50. A plurality of wind power generation systems 4b may be provided.

(Tenth Embodiment)

Figure 21:
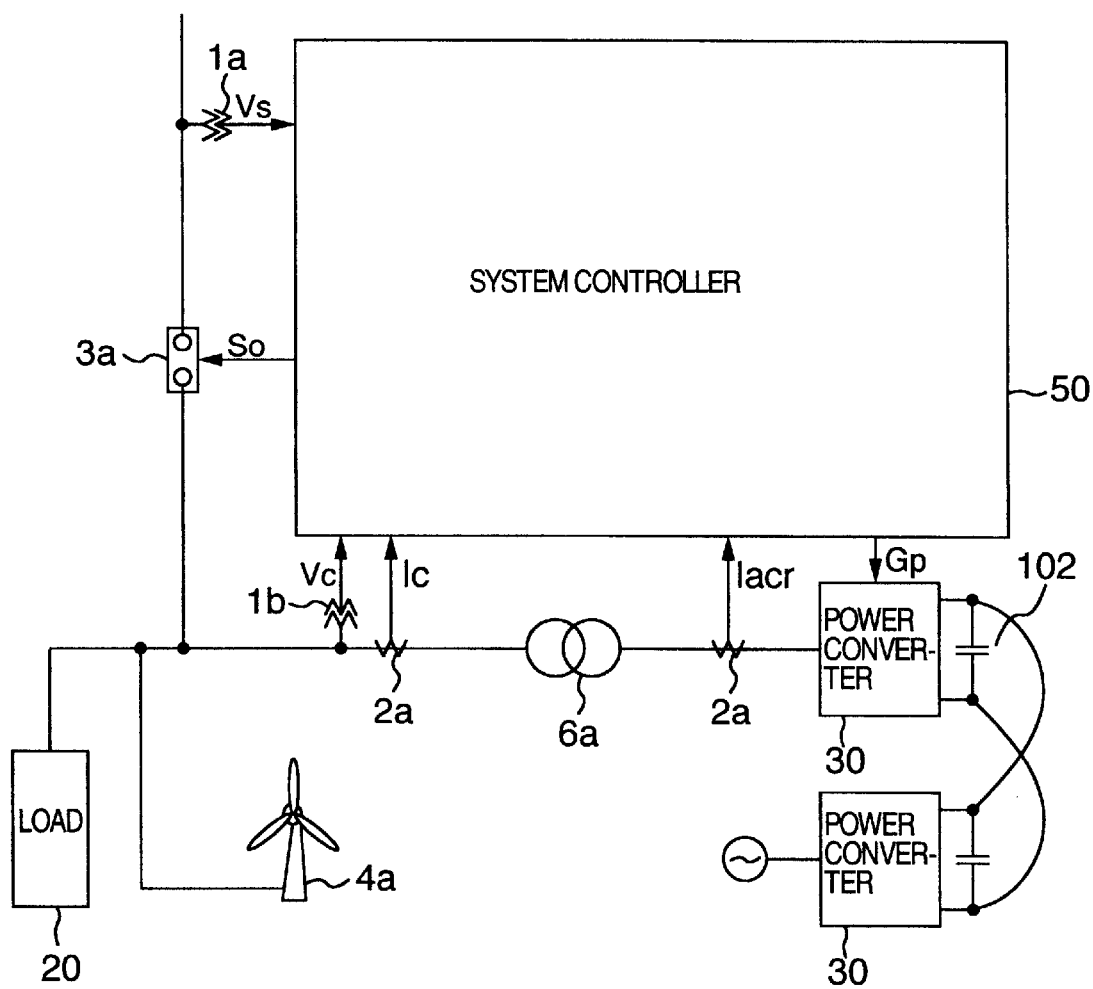
FIG. 21 is an explanatory diagram of a tenth embodiment in which a dc transmission system is provided.

In a tenth embodiment, a dc power transmission system 102 is provided, as shown in FIG. 21. The output of the dc power transmission system supplies electric power to the system from the converter.

What is claimed is:

1. A power converter system comprising:

switching on/off means having one terminal connected to a power system and another terminal connected to a load;

a transformer for interconnection;

a power converter; and a controller for controlling said power converter, wherein said power converter supplies electric power to said load through said transformer and is connected to said power system through said switching on/off means, and said controller outputs a control signal for adjusting an output phase of said power converter on the basis of an ac voltage on a power system side of said switching on/off means and an ac voltage on a load side thereof so as to eliminate a phase difference between the power system-side ac voltage and the load-side ac voltage.

2. The power converter system according to claim 1, wherein said controller outputs a signal for opening or closing said switching on/off means in accordance with the phase difference.

3. The power converter system according to claim 2, wherein said controller has a current controlling system for switching over a current command between system interconnection operation and self commutated operation.

4. The power converter system according to claim 1, wherein said power converter is further connected to a wind power generator system, and said power converter has energy storage means.

5. A power converter system comprising:

switching on/off means having one terminal connected to a power system and another terminal connected to a load;

a transformer for interconnection;

a power converter; and a controller for controlling said power converter, wherein said power converter supplies electric power to said load through said transformer and is connected to said power system through said switching on/off means, and said controller outputs a signal for opening or closing said switching on/off means on the basis of an ac voltage on a power system side of said switching on/off means and an ac voltage on a load side thereof in response to a phase difference between the power system-side ac voltage and the load-side ac voltage.

6. The power converter system according to claim 5, wherein said controller outputs the signal for closing said switching on/off means when the phase difference is close to zero.

7. The power converter system according to claim 5, wherein said power converter is further connected to a wind power generator system, and said power converter has energy storage means.

8. A method of controlling a power converter which supplies electric power to a load and is connected to the load and to a power system through switching on/off means, comprising the steps of:

adjusting an output phase of said power converter on the basis of an ac voltage on a power system side of said switching on/off means and an ac voltage on a load side thereof so as to eliminate a phase difference between the power system-side ac voltage and the load-side ac voltage during self commutated operation of said converter; and closing and switching on/off means when said phase difference is close to zero.

* * * * *